Sheet 2. 2-Sheets

D. B. Woodward.
Horse Rake.

Nº 503
31507

Patented Feb. 19, 1861.

Witnesses
G. R. Adams
H. N. Steele

Inventor
Davis B. Woodward

UNITED STATES PATENT OFFICE.

DAVIS B. WOODWARD, OF ERCILDOUN, PENNSYLVANIA.

IMPROVEMENT IN HORSE-RAKES.

Specification forming part of Letters Patent No. 31,507, dated February 19, 1861.

*To all whom it may concern:*

Be it known that I, DAVIS B. WOODWARD, of Ercildoun, in the county of Chester and State of Pennsylvania, have invented a new and useful Improvement in Horse-Rakes; and I do hereby declare that the following is a full, clear, and exact description of the construction and operation of the same, reference being had to the annexed drawings, making a part of this specification, in which—

Figure 1:
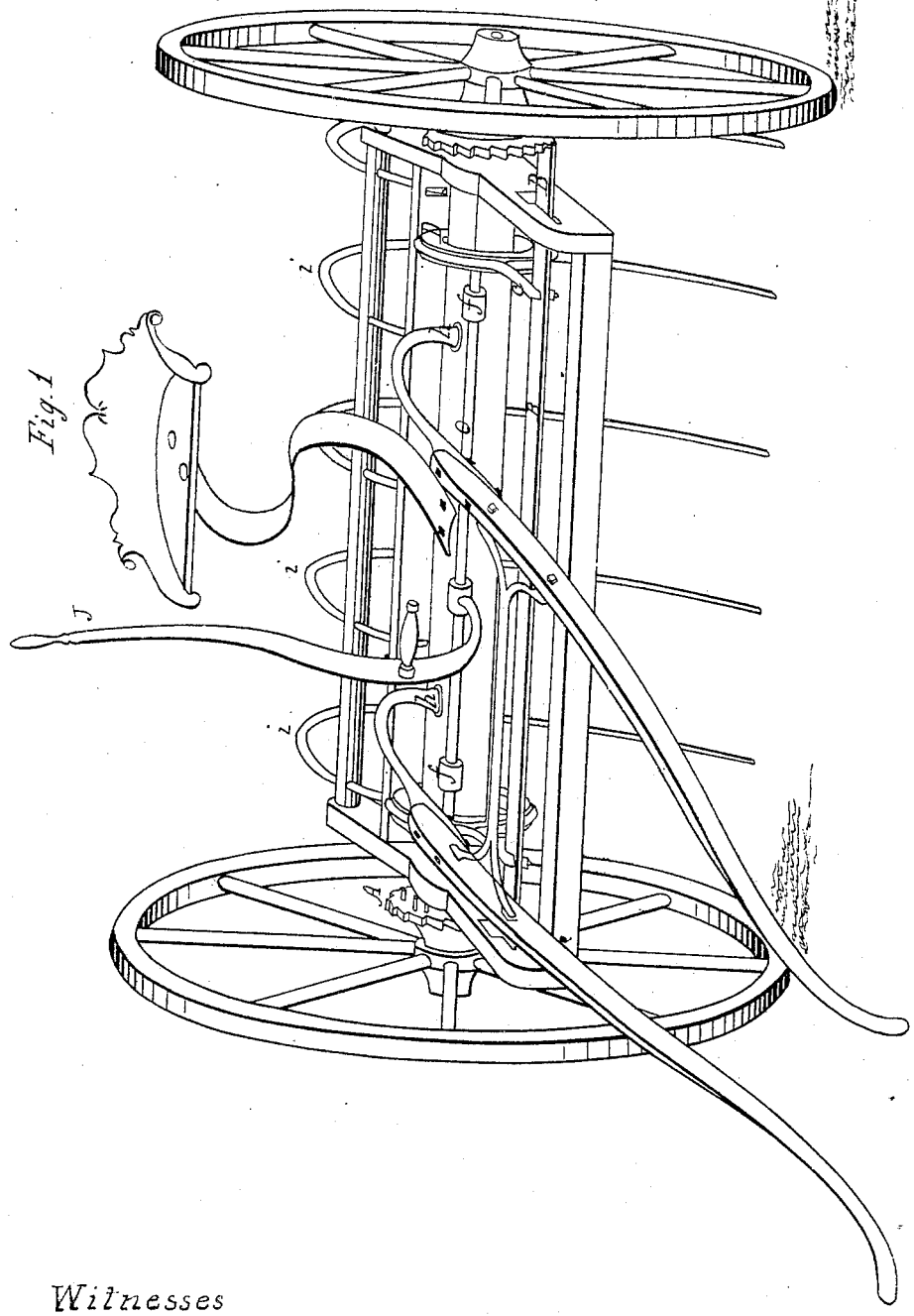
Figure 2:
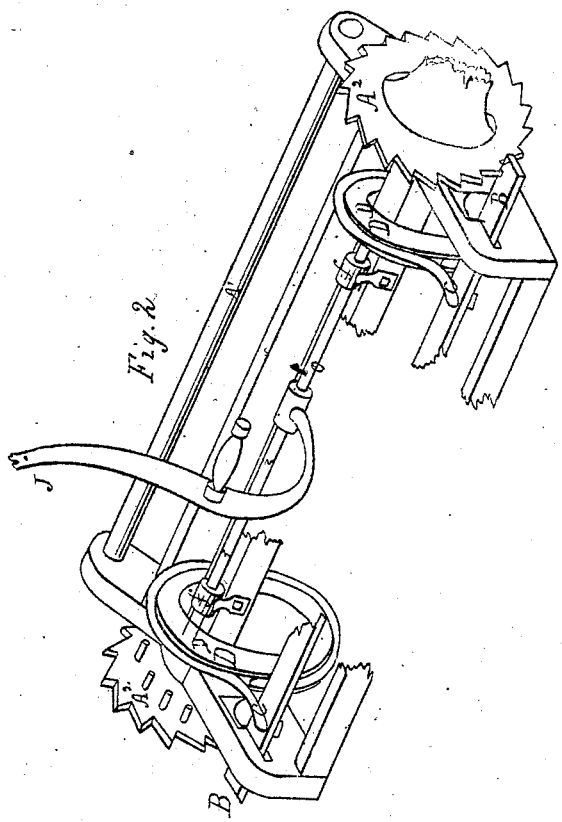

Figure 1 is a perspective view; Fig. 2, a transverse section with a part of the frame cut away and carrying-wheels removed.

The apparatus I am about to describe is represented in the accompanying drawings, as applied to a horse-rake, A' being a frame that is hung on the axle-tree in such a manner that a rocking motion can be imparted to it by the ratchet-wheels $A^2 A^2$ and slide-bar B connected with the cam-wheels D D by the curved rods $c\,c$ in Fig. 2, operated by the lever to which is attached the rope J. The lever is fastened to the bar O, which is held in its place by the hinge-fastenings $f\,f$, which are firmly attached to the axle-tree of the rake, the teeth $i\,i\,i\,i$ fixed in the frame in such a manner as to have no motion independent of the frame A'.

$h$ are the shafts by which the horse or other animal is attached to the rake.

When the rake is in motion the slide-bar B, which moves in an oblong slot in the front part of the frame A', is thrown forward until it is necessary to discharge the accumulated hay, when a person walking behind can operate the lever by the rope J, when the slide-bar B is drawn back and made to act as pawls on the ratchet-wheels $A^2 A^2$, by which means the front of the rocking frame A' will be sufficiently depressed to elevate the rake-tooth $i\,i\,i\,i$, when the hay will be discharged.

What I claim as my invention, and desire to secure by Letters Patent, is—

The rocking frame A', having the teeth $i\,i\,i\,i$ applied to it in the manner described, in combination with the rock-shaft O, cam-wheels D D, bar B, and ratchet-wheels $A^2 A^2$, these several parts being constructed and arranged for joint operation in the manner and for the purpose specified.

In testimony whereof I have hereunto subscribed my name.

DAVIS B. WOODWARD.

Witnesses:
 H. G. THOMAS,
 J. C. KEECH.